United States Patent
Verhaeghe et al.

(10) Patent No.: US 9,474,209 B2
(45) Date of Patent: Oct. 25, 2016

(54) LIFTING SYSTEM FOR A HARVESTER WITH A PIVOTABLE CYLINDER

(75) Inventors: Didier O. M. Verhaeghe, Ieper (BE); Bart M. A. Missotten, Winksele (BE)

(73) Assignee: CNH Industrial America LLC, New Holland, PA (US)

( * ) Notice: Subject to any disclaimer, the term of this patent is extended or adjusted under 35 U.S.C. 154(b) by 228 days.

(21) Appl. No.: 14/233,557

(22) PCT Filed: Jul. 20, 2012

(86) PCT No.: PCT/EP2012/064356
§ 371 (c)(1),
(2), (4) Date: May 2, 2014

(87) PCT Pub. No.: WO2013/011141
PCT Pub. Date: Jan. 24, 2013

(65) Prior Publication Data
US 2014/0237980 A1    Aug. 28, 2014

(30) Foreign Application Priority Data
Jul. 20, 2011 (BE) .................................. 2011/0467

(51) Int. Cl.
*A01D 41/14* (2006.01)
*A01D 46/08* (2006.01)
*A01D 75/28* (2006.01)

(52) U.S. Cl.
CPC ............. *A01D 41/14* (2013.01); *A01D 41/145* (2013.01); *Y10T 29/4973* (2015.01)

(58) Field of Classification Search
CPC .. A01D 41/14; A01D 41/141; A01D 41/145; A01D 34/283; F15B 11/028; A01B 59/048

USPC .................................. 56/10.2 E, 320.1
See application file for complete search history.

(56) References Cited

U.S. PATENT DOCUMENTS

| | | | | |
|---|---|---|---|---|
| 3,324,637 A | * | 6/1967 | Windsor | A01D 41/16 56/15.6 |
| 3,431,711 A | * | 3/1969 | Reinhold | A01D 41/12 56/14.5 |
| 3,643,407 A | * | 2/1972 | Hubbard | A01D 46/08 56/10.2 E |
| 3,665,688 A | * | 5/1972 | Sheehan | A01D 41/14 56/14.6 |
| 3,717,995 A | * | 2/1973 | Case | F15B 1/02 60/413 |
| 3,731,470 A | * | 5/1973 | Cornish | A01D 75/285 280/124.128 |
| 4,175,366 A | * | 11/1979 | Cicci | A01D 41/14 56/15.8 |

(Continued)

FOREIGN PATENT DOCUMENTS

| | | |
|---|---|---|
| EP | 212185 A1 | 3/1987 |
| EP | 1483953 A1 | 12/2004 |

(Continued)

*Primary Examiner* — Árpád Fábián-Kovács
(74) *Attorney, Agent, or Firm* — Patrick M. Sheldrake; Peter K. Zacharias

(57) ABSTRACT

An agricultural machine includes a first cutting or collection system, a height-adjustable feeder connected to the first cutting or collection system; and a hydraulic lifting device connected to the feeder. The hydraulic lifting device includes a pivotable element carried by the machine; a beam-shaped element hingedly connected at one end to the feeder and at the other end to the pivotable element; and a cylinder hingedly connected at one end to the beam-shaped element and at the other end to the pivotable element such that extension of the cylinder causes the pivotable element to pivot and a height of the feeder to change.

9 Claims, 3 Drawing Sheets

(56) References Cited

U.S. PATENT DOCUMENTS

| | | | | |
|---|---|---|---|---|
| 4,266,391 A * | 5/1981 | McDuffie | A01D 41/16 56/14.5 |
| 4,266,392 A * | 5/1981 | Knepper | A01D 41/14 56/14.5 |
| 4,612,757 A * | 9/1986 | Halls | A01D 75/287 56/10.2 E |
| 4,641,490 A * | 2/1987 | Wynn | A01D 41/145 56/10.2 E |
| 4,722,173 A * | 2/1988 | Covington | A01D 67/00 56/15.6 |
| 4,733,523 A * | 3/1988 | Dedeyne | A01D 75/287 56/10.2 E |
| 4,776,153 A * | 10/1988 | DePauw | A01D 41/145 56/10.2 E |
| 4,993,216 A * | 2/1991 | Covington | A01D 46/08 56/15.9 |
| 5,046,230 A | 9/1991 | Hurlburt | |
| 5,415,586 A * | 5/1995 | Hanson | A01D 75/287 180/41 |
| 5,433,065 A * | 7/1995 | Mosby | A01D 41/14 56/13.9 |
| 5,687,555 A * | 11/1997 | Klein | A01D 34/47 56/15.8 |
| 5,778,644 A * | 7/1998 | Keller | A01D 41/142 56/11.2 |
| 5,799,483 A * | 9/1998 | Voss | A01D 75/287 460/119 |
| 5,906,089 A * | 5/1999 | Guinn | A01D 41/145 56/10.2 E |
| 5,964,077 A * | 10/1999 | Guinn | A01D 41/14 56/10.2 E |
| 5,983,615 A * | 11/1999 | Schmid | A01D 41/14 56/208 |
| 6,073,431 A * | 6/2000 | Osborne | A01D 41/16 56/15.7 |
| 6,151,874 A * | 11/2000 | Eis | A01B 63/10 172/4 |
| 6,510,680 B2 * | 1/2003 | Uhlending | A01D 75/287 56/10.2 E |
| 6,516,595 B2 * | 2/2003 | Rhody | A01B 63/1145 172/4 |
| 6,698,174 B2 * | 3/2004 | Martignon | A01B 59/048 56/15.6 |
| 6,826,894 B2 * | 12/2004 | Thiemann | A01D 41/141 56/10.2 E |
| 6,901,729 B1 * | 6/2005 | Otto | A01D 41/145 56/208 |
| 7,191,582 B2 * | 3/2007 | Bomleny | A01D 41/141 56/10.2 E |
| 7,222,475 B2 * | 5/2007 | Bomleny | A01D 41/141 56/10.2 E |
| 7,430,846 B2 * | 10/2008 | Bomleny | A01D 41/141 56/10.2 E |
| 7,530,921 B2 * | 5/2009 | Fackler | A01D 75/18 477/96 |
| 7,555,883 B2 * | 7/2009 | Fackler | A01D 41/145 56/10.2 E |
| 7,603,837 B2 * | 10/2009 | Ehrhart | A01D 34/283 56/10.2 E |
| 7,669,392 B2 * | 3/2010 | Ehrhart | A01D 34/283 56/10.2 E |
| 7,703,266 B2 * | 4/2010 | Fackler | A01D 41/145 56/10.2 E |
| 7,853,382 B2 * | 12/2010 | Anderson | E02F 9/2029 340/684 |
| 8,230,771 B2 * | 7/2012 | Bitter | A01D 41/145 60/477 |
| 8,726,622 B2 * | 5/2014 | Wagner | F15B 15/261 267/64.12 |
| 2004/0040276 A1 * | 3/2004 | Allworden | A01D 41/141 56/10.2 R |
| 2006/0248868 A1 * | 11/2006 | Otto | A01D 41/145 56/10.2 E |
| 2006/0254239 A1 * | 11/2006 | Fackler | A01D 41/145 56/15.8 |
| 2014/0215992 A1 * | 8/2014 | Schraeder | A01D 41/145 56/14.7 |

FOREIGN PATENT DOCUMENTS

| | | |
|---|---|---|
| FR | 1604217 A | 10/1971 |
| GB | 856623 A | 12/1960 |
| WO | 2008155582 A2 | 12/2008 |

\* cited by examiner

LIFTING SYSTEM FOR A HARVESTER WITH A PIVOTABLE CYLINDER

This application is the US National Stage filing of International Application Serial No. PCT/EP2012/064356 filed on Jul. 20, 2012 which claims priority to Belgian Application BE2011/0467 filed Jul. 20, 2011, each of which is incorporated herein by reference in its entirety.

FIELD OF THE INVENTION

The invention relates to harvesting machines, in particular combine harvesters, and especially to the lifting system with which the feeder system of the combine harvester is lifted.

STATE OF THE ART

Combine harvesters that are currently used in agriculture, are equipped with a header, which over its entire width is equipped with knives to cut off the crops in the field. The header is attached to a crop supply system, often named "feeder", which term will be used in the further course of the text. The harvested crop is collected via the feeder and transferred into the combine harvester, where it is further processed. With usual machines, the feeder is rotatably attached to the frame of the combine harvester and adjustable in height by means of a hydraulic lifting system, consisting of one or more hydraulic cylinders, which are connected between a hinge point on the frame of the combine harvester and a hinge point on the feeder. To be able to perform the lifting movement with minimum hydraulic pressure, it is beneficial to place the hinge point on the feeder and the hinge point on the combine harvester as far as possible from the pivot axis of the feeder with respect to the frame.

However, in the systems of the state of the art, this can lead to problems when it is wanted to install an additional cutting device behind the header, such as a knife drum. When harvesting grain-like crop with modern combine harvesters, one can seek to harvest only the upper portion of the crops, i.e. the ears and an (as small as possible) upper part of the stems. For this purpose, during harvesting, the header is raised by means of the hydraulic lifting system at a sufficiently large height from the ground so that the front cutter blades of the header cut off the stems at a relatively great height. One way to process the remaining stems is to attach a knife drum behind the header to mow and shred the stems. Such a knife drum (including the housing in which the drum is mounted and its actuator) is also known as "chopper", which term will also be used further in this description. An example of such a system is described in patent application EP-A-1483953. The chopper is preferably a component that is not permanently mounted on the machine, but can be attached and removed. In many existing harvesters however, the location of the lifting cylinder is an obstacle for the better attachment of the chopper. To remedy this, up to now it was required to move the point of action of the cylinders on the feeder closer to the frame of the combine, which however substantially increased the required lifting force. EP-A-1483953 shows for example that the point of action is located about halfway the feeder. A location of this point at the front of the feeder would make the installation of the chopper difficult at the lowest position of the feeder.

MAIN FEATURES OF THE INVENTION

The invention provides a solution to the problems described above by providing a system as described in the appended claims.

According to a first aspect of the invention, an agricultural machine is provided, suitable for the harvesting of crops, equipped with a height-adjustable feeder that on its rear side is linked to the machine and to which on its front side a first cutting or collection system for the plants can be attached, and equipped with a hydraulic lifting device in order to be able to control the height of the feeder with respect to the machine, characterised in that the lifting device contains at least one lifting system, which comprises a hydraulic cylinder and a beam-shaped element which is connected by hinges to the feeder in a first hinge point located at the front of the feeder, and wherein the cylinder is configured to exert a force on the beam-shaped element at one end of the cylinder in a second hinge point which is located on the beam-shaped element, at a distance behind the first hinge point.

The use of the intermediate beam makes it possible to use a shorter cylinder, so that more space is kept free for the assembly of an additional cutting or collection system, for example a knife drum.

Preferably, the cylinder is supported by a bracket, which is connected by hinges to the agricultural machine. The hinge point of the cylinder on the bracket is preferably located above the hinge point of the bracket on the machine.

In another hinge point, the beam-shaped element can be connected to the top of the bracket. The result is a mechanism that converts a short movement of the cylinder into a larger movement of the beam and consequently of the feeder.

In a preferred embodiment, the bracket tilts to the front at the lowest position of the feeder, and to the back in its highest position. In this way, the beam remains at a limited distance from the underside of the feeder, and will take up no additional space during its displacement.

The cylinder can be mounted on a protuberance of the beam-shaped element, preferably at the middle of the latter.

According to a second aspect of the invention, a method is provided for the replacement of a lifting system of an agricultural machine for harvesting crops, equipped with a height-adjustable feeder that is connected with its rear side to the machine and wherein on its front side a first cutting or collection system for the crop can be attached, and in which the original lifting system contains an original hydraulic cylinder that is connected by hinges to the feeder in a first hinge point located at the front of the feeder, and to the machine in a further hinge point, wherein the method includes the following steps:

disconnecting a hydraulic line to the original cylinder; and removing the original cylinder from between the first hinge point and the further hinge point, characterised in that the method includes the following steps:

mounting another lifting system between the first hinge point and the further hinge point, wherein the other lifting system includes a beam-shaped element which is provided for the hinged connection to the feeder in a first hinge point, and another hydraulic cylinder that is configured to exert force in one end of the cylinder on the beam-shaped element in a second hinge point which is located on the beam-shaped element, at a distance behind the first hinge point; and connecting said hydraulic line to the other hydraulic cylinder.

This method allows for replacement of a longer cylinder, which would take up a substantial amount of room below the feeder, with a lifting system which leaves more space for mounting additional elements, such as a second cutting and/or collection system. So, it will not be necessary to modify structural elements to the frame of the agricultural machine or the housing of the feeder. Also, the original hydraulic connection of the cylinders is further used.

Preferably, the lifting system is configured in such a way that a supply of hydraulic oil via the hydraulic line to the other lifting system creates a displacement of the feeder, which is substantially equal to the displacement achieved by the same supply of hydraulic oil to the original lifting system. The advantage of this is that it is not necessary to replace or adjust the hydraulic control. One way to accomplish this is to use another cylinder or set of cylinders, of which the piston displacement between the extreme positions of the feeder is substantially equal to the displacement volume of the original cylinder between the same positions.

DETAILED DESCRIPTION OF PREFERRED EMBODIMENTS

Figure 1A:
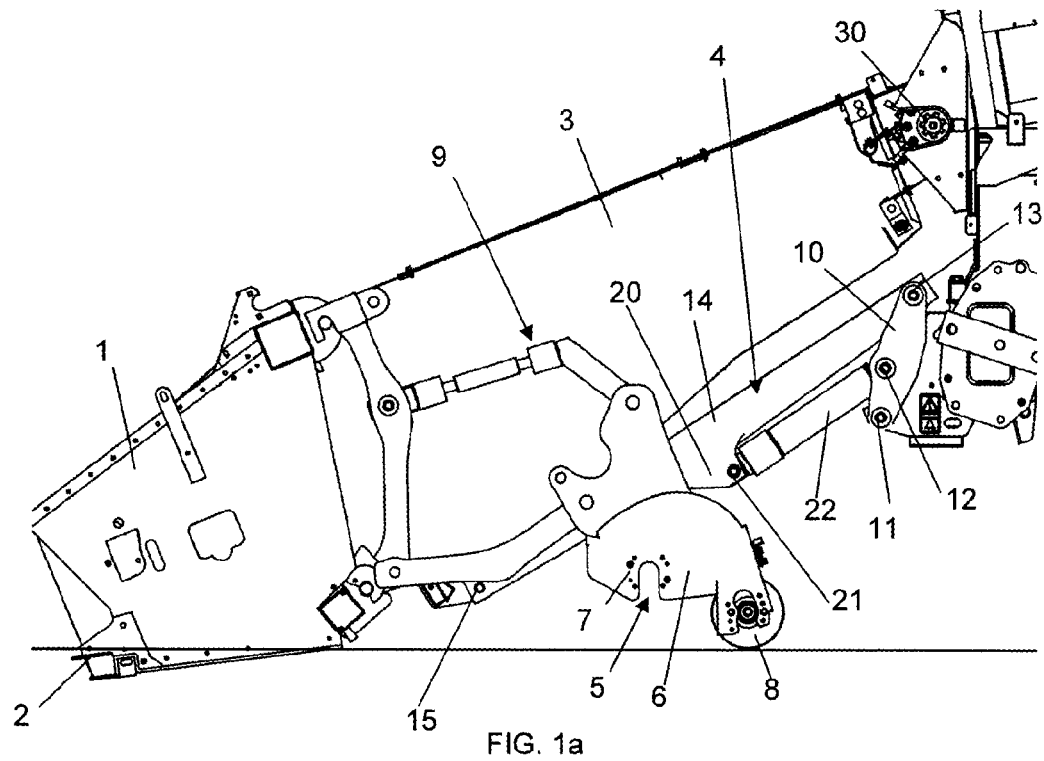
FIGS. 1a to 1d show a harvesting machine according to the invention in four successive positions of the feeder, from a low position to a high position.
Figure 1B:
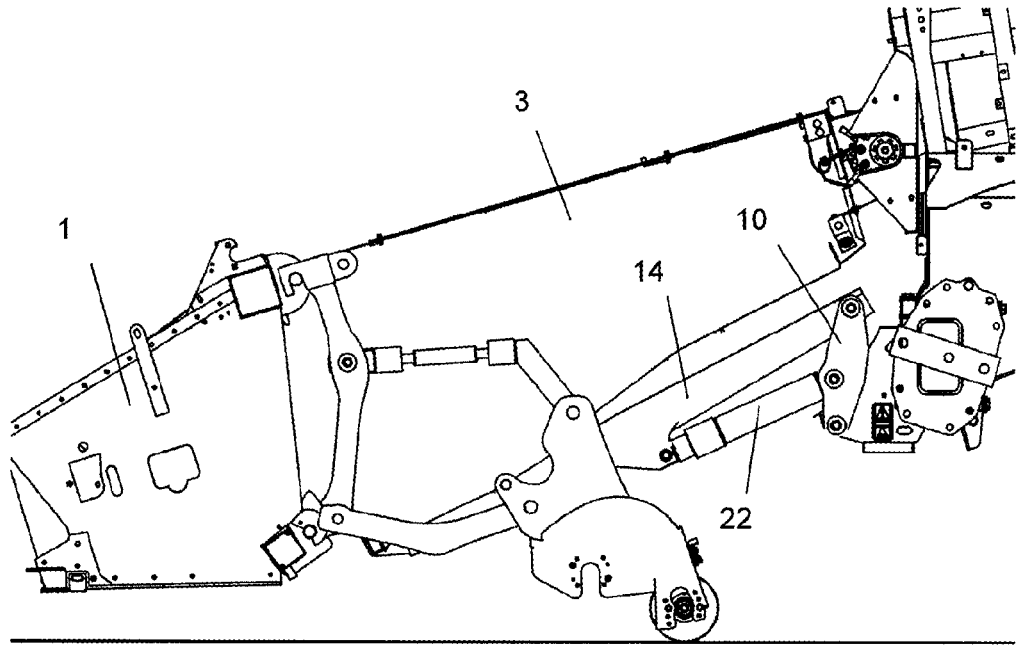
Figure 1C:
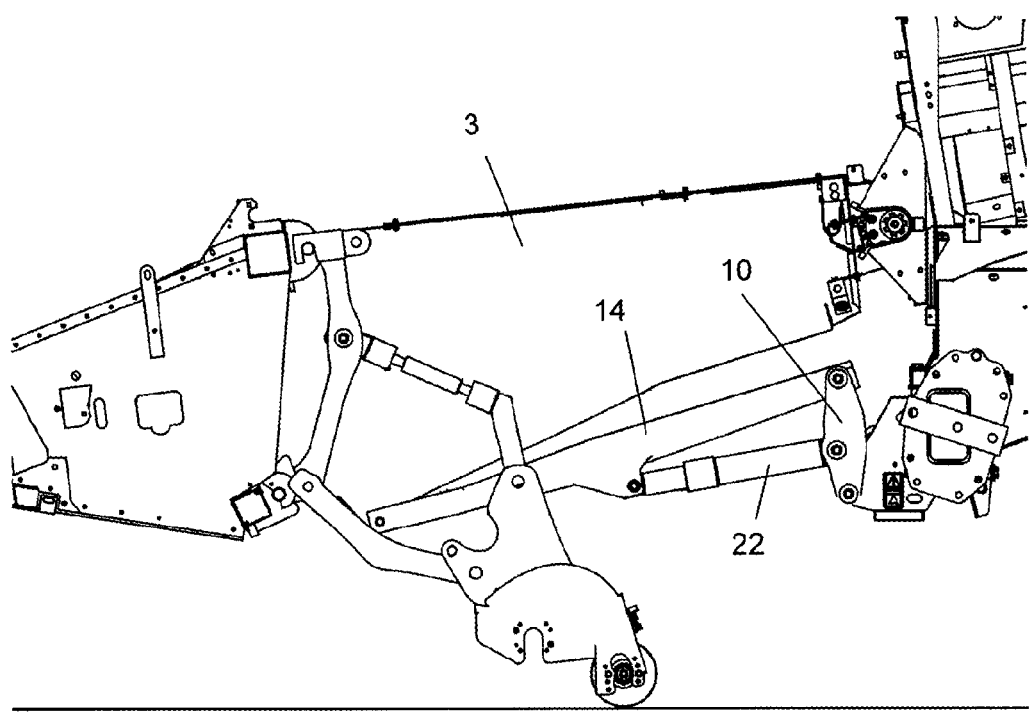
Figure 1D:
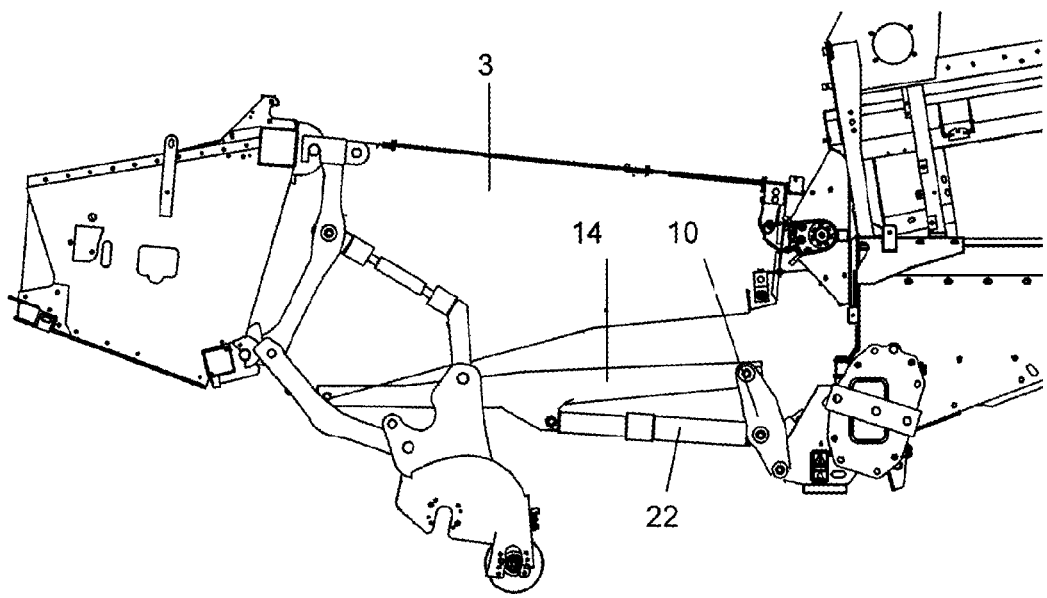

FIG. 1a shows the following parts of a combine harvester with a lifting system according to the invention: a header 1, with a front cutting device 2, comprising two sets of knives of which at least one set is moved with respect to the other, driven by a gear box with rotating input shaft and an output shaft that moves back and forth (so called wobble box). In addition, it shows a feeder 3, with a front to which the header is connected, and a rear which is connected to the frame of the combine harvester. The feeder 3 can be rotated around a horizontal transverse axis 30 by means of a hydraulic lifting system 4 according to the invention. To the rear of the header 1 an additional cutting device, in particular a chopper 5, is attached. This consists of a housing 6 in which the knife drum 7 of the chopper is rotatably arranged. The knife drum is driven by a drive mechanism, e.g. a motor equipped with a belt transmission, which is located at one lateral end of the chopper. The housing 6 of the chopper rests on the ground via two or more support rollers 8 (one on each side of chopper). The chopper is attached to the rear side of the header by means of a system 9 of pivoting supporting arms.

Hereinafter, the lifting system 4 is described in more detail. Preferably, the machine is equipped with two of these systems, one on each side of the feeder. The system includes a bracket 10, which is equipped with three hinge points: a lower hinge point, 11, a middle hinge point 12 and a topmost hinge point 13. The bracket may be designed as a double plate, between which pivots are mounted, defining the three hinge points. The bracket 10 is rotatably attached to the combine harvester through the lower hinge point 11. In the illustrated embodiment, the upper hinge point 13 is attached to a transverse beam at the front of the frame of the combine harvester. Via the upper hinge point 13, the bracket is rotatably attached to an end of a beam-shaped element 14, which at the other end is rotatably attached to the feeder 3 through a front hinge point 15 located at the front of the feeder. The beam 14 has a protuberance 20 in the middle of its length, which protrudes from the longitudinal axis of the beam, in a direction away from the feeder 3. A hinge point 21 is located on this protuberance 20. This hinge point 21 is thus located below the line connecting the upper and front hinge points 13, 15 of beam 14. A hydraulic cylinder 22 is mounted between the hinge point 21 on the protuberance 20 and the middle hinge point 12 on the bracket 10. Preferably, the beam has a plate profile with U-shaped cross section. The protuberance 20 can be formed by two plates that are welded on opposite sides of the beam and between which a bushing or rotary shaft is mounted which defines the hinge point 21.

FIGS. 1a to 1d show how the extension of the cylinder 22 drives the lifting movement of the feeder 3. A retracted cylinder 22 pulls the middle hinge point 12 towards the centre of the beam 14, and thus makes the back of the bracket 10 tilt to the rear. When the cylinder 22 extends, the hinge point 21 and the beam 14 move to the front. The movement of the upper hinge point 13 on the beam tilts the bracket 10 forward, around the lower hinge point 11. The forward tilting of the hinge point 12 (to which the cylinder is attached) increases the displacement of the front hinge point 15 and thus the maximum lifting height of the header 1, compared to a system in which the cylinder has a fixed rear hinge point with respect to the combine harvester. This makes it possible, despite the shorter length of the cylinder, to obtain similar heights as with the known systems (with the points of action of the cylinder at the front of the feeder and the frame of the combine harvester).

As can be seen in the Figures, the beam 14 and a shorter cylinder 22 leave more free space below the feeder than a conventional lifting system in which the cylinder directly acts on the front of the feeder (e.g. in hinge point 15) and the front of the frame (e.g. in hinge point 11). Thus, this system allows more space for optimum installation of the chopper 5. Mounting the cylinder 22 beneath the rear part of the feeder 3 ensures that it will not interfere in any position with devices which are mounted under the front part.

The distance between the upper hinge point 13 and the front hinge point 15, and therefore the length of the beam 14, is chosen in such a way that the bracket 10 is tilted to the back in the lowest position of the feeder 3 and to the front in the highest position. This will keep the trajectory followed by the upper hinge point 13 always close to the bottom of the feeder. Consequently, the beam 14 will not move far from the feeder 3 and will take up little additional space under the feeder while the feeder is turned up.

The forces on the cylinder 22 are more than twice as great as the forces on a cylinder which is mounted between the hinge points 11 and 15. These forces can, however, be compensated for by choosing a cylinder with a section twice as large as that of the conventional cylinders. The pressure in the hydraulic system will not increase then. Due to the larger diameter of the cylinder in combination with the kinematics of the bracket 10 and the beam 14, it is also achieved with an approximately equal flow of hydraulic oil, the feeder 3 will lift itself to a same height as in the usual set-up. The displacement volume of the cylinder 22 between the extreme positions of the feeder 3 is substantially equal to the displacement volume of the former cylinder between the same positions.

The invention is not limited to combine harvesters equipped with a chopper system. The lifting system 4 of the present invention indeed is suitable for any agricultural machine in which a lifting movement of a feeder can be implemented. Instead of a header, the machine can be equipped with other cutting or collection systems.

Figure 2:
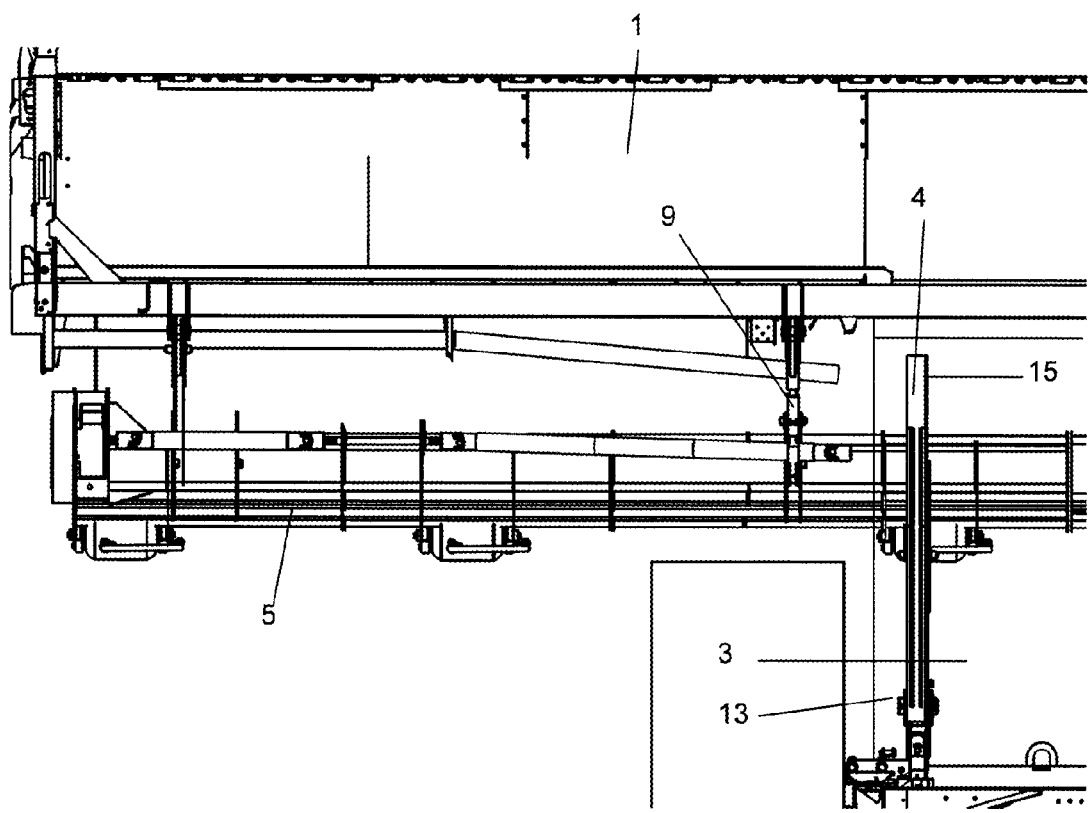
FIG. 2 shows a top view of the front of a machine according to the invention.

In the top view of FIG. 2, the location can be seen where the left-hand lifting system 4 is installed with respect to the width of the feeder 3. Thus, preferably two lifting systems 4 are placed, symmetrically with respect to the longitudinal axis of the machine.

The above description is not limiting the scope of the invention, which is only defined by the claims. For example, a system with the hinge point 21, but wherein the hinge points 11 and 12 coincide, is also included in the invention. In other words, the cylinder may be hinged at one end in a hinge point which is fixed or rotatably attached to the machine. In such a system, in case of equal length of the cylinder, the lifting height is limited, because the point of attachment of the cylinder does not tilt forward, but the point of action of the cylinder is at a sufficiently great distance from the front hinge point 15, so that the advantage of the better installation possibilities of a chopper is still ensured. The shape of the beam 14 may also differ from the described shape. It is not necessary that the hinge point 21 be located on a protuberance 20, but it may also be located closer to, or even on the line between the points 15 and 13, although this is not the ideal situation with respect to the forces required for the movement. However, what is important is the fact that the point of action 21 of the cylinder is situated at a distance behind the point of action 15 of the beam on the feeder. Optionally, the beam 14 can be supported only in points 15 and 21, in other words, the hinge point 13 is not indispensable.

The invention claimed is:

1. An agricultural machine, comprising:
   a first cutting or collection system;
   a height-adjustable feeder connected to said first cutting or collection system; and
   a hydraulic lifting device connected to said feeder, said hydraulic lifting device including:
      a pivotable element carried by said machine;
      a beam-shaped element hingedly connected at one end to said feeder and at the other end to said pivotable element; and
      a cylinder hingedly connected at one end to said beam-shaped element and at the other end to said pivotable element such that extension of said cylinder causes said pivotable element to pivot and a height of said feeder to change.

2. The agricultural machine according to claim 1, wherein said pivotable element is a bracket hingedly connected to said machine at a bracket hinge point.

3. The agricultural machine according to claim 2, wherein said cylinder hingedly connects to said bracket at a cylinder hinge point which is above said bracket hinge point.

4. The agricultural machine according to claim 3, wherein said beam-shaped element hingedly connects to said bracket at a beam hinge point which is above said cylinder hinge point.

5. The agricultural machine according to claim 2, wherein said feeder has a lowest position and a highest position, a top of said bracket tilting backwards when said feeder is in said lowest position and tilting forward when said feeder is in said highest position.

6. The agricultural machine according to claim 1, wherein said beam-shaped element has a protuberance which points away from said feeder, said cylinder being hingedly connected to said protuberance.

7. The agricultural machine according to claim 1, wherein said cylinder is hingedly connected to said beam-shaped element at a middle of said beam-shaped element.

8. The agricultural machine according to claim 1, wherein a front side of said feeder is connected to said first cutting or collection system and an additional cutting or collection system is fastened to a rear side of said first cutting or collection system.

9. The agricultural machine according to claim 8, wherein said first cutting or collection system includes a header.

* * * * *